United States Patent
Goodall et al.

(10) Patent No.: US 11,752,540 B2
(45) Date of Patent: Sep. 12, 2023

(54) TWISTED HELICALLY SHAPED MEMBER

(71) Applicant: Product Licensing Company Ltd, Portsmouth (GB)

(72) Inventors: Richard James Goodall, Leeds (GB); William Henry Ollis, Haddenham (GB)

(73) Assignee: Product Licensing Company Ltd ( * ) Notice: Subject to any disclaimer, the term of this patent is extended or adjusted under 35 U.S.C. 154(b) by 0 days.

(21) Appl. No.: 17/903,481

(22) Filed: Sep. 6, 2022

(65) Prior Publication Data
US 2022/0410250 A1  Dec. 29, 2022

Related U.S. Application Data

(63) Continuation of application No. 17/639,363, filed as application No. PCT/GB2020/005938 on Aug. 13, 2020, now Pat. No. 11,738,383.

(30) Foreign Application Priority Data

Aug. 24, 2019 (GB) .................................... 2112489
Sep. 1, 2019 (GB) .................................... 1912551

(51) Int. Cl.
B21F 7/00       (2006.01)
B21F 3/02       (2006.01)
B21F 11/00      (2006.01)
B21F 45/16      (2006.01)
F16B 13/00      (2006.01)
(Continued)

(52) U.S. Cl.
CPC .................. B21F 7/00 (2013.01); B21F 3/02 (2013.01); B21F 11/00 (2013.01); B21F 45/16 (2013.01); E04C 5/03 (2013.01); F16B 13/00 (2013.01); F16B 13/02 (2013.01)

(58) Field of Classification Search
CPC .... B21F 7/00; B21F 3/02; B21F 11/00; B21F 45/16; B21F 45/006; E04C 5/03; E04C 5/012; F16B 13/00; F16B 13/02; F16B 13/002; B21D 11/14; B21D 11/06;
(Continued)

(56) References Cited

U.S. PATENT DOCUMENTS 497,827 A    5/1893  Sellers
1,549,140 A  8/1925  McCurdy
(Continued)

FOREIGN PATENT DOCUMENTS

EP    1975421 B1    5/2009
EP    3181261 A1    6/2017
(Continued)

Primary Examiner — Matthew D Matzek
(74) Attorney, Agent, or Firm — Endurance Law Group PLC

(57) ABSTRACT

A twisted helically-shaped member (15) in the form of a twisted tie, twisted fastener, twisted wire or twisted rod; said twisted helically-shaped member (15) having an axial core (12) and a plurality of helical threads (13H) extending along the axial core (12); and wherein a variation in lead measurements along the length of at least one helical thread (13H), is less than a variation in pitch measurements along the lengths of the helical threads (13H); wherein the axial core (12) has a transverse cross-sectional area comprising two-fifths or less of the transverse circumscribed cross-sectional area of the helical threads (13H).

18 Claims, 3 Drawing Sheets

(51) Int. Cl.
*E04C 5/03* (2006.01)
*F16B 13/02* (2006.01)

(58) Field of Classification Search
CPC .... B21G 3/20; B21K 1/56; B21K 5/04; B21C 3/02; E04B 1/4178
USPC .......................... 428/364, 369, 371, 397, 399
See application file for complete search history.

(56) References Cited

U.S. PATENT DOCUMENTS

| | | | |
|---|---|---|---|
| 1,607,089 | A | 11/1926 | Leidecker |
| 7,269,987 | B2 | 9/2007 | Ollis |
| 2004/0237440 | A1 | 12/2004 | Paterson et al. |
| 2007/0197303 | A1* | 8/2007 | Ollis ........................ E04F 13/04 470/8 |
| 2009/0022568 | A1 | 1/2009 | Becker et al. |
| 2009/0279983 | A1* | 11/2009 | Ollis .................... B25B 15/004 411/386 |
| 2010/0329812 | A1 | 12/2010 | Goettlich |
| 2013/0336744 | A1* | 12/2013 | Phua .................. F16B 25/0026 411/387.1 |
| 2021/0033137 | A1* | 2/2021 | Andersson ............... F16B 33/02 |

FOREIGN PATENT DOCUMENTS

| | | | |
|---|---|---|---|
| GB | 868077 | A | 5/1961 |
| GB | 2344629 | A | 6/2000 |
| WO | 2000061887 | A1 | 10/2000 |
| WO | 2013187844 | A1 | 12/2013 |
| WO | WO-2019143284 | A1 * | 7/2019 .......... F16B 25/0015 |

* cited by examiner

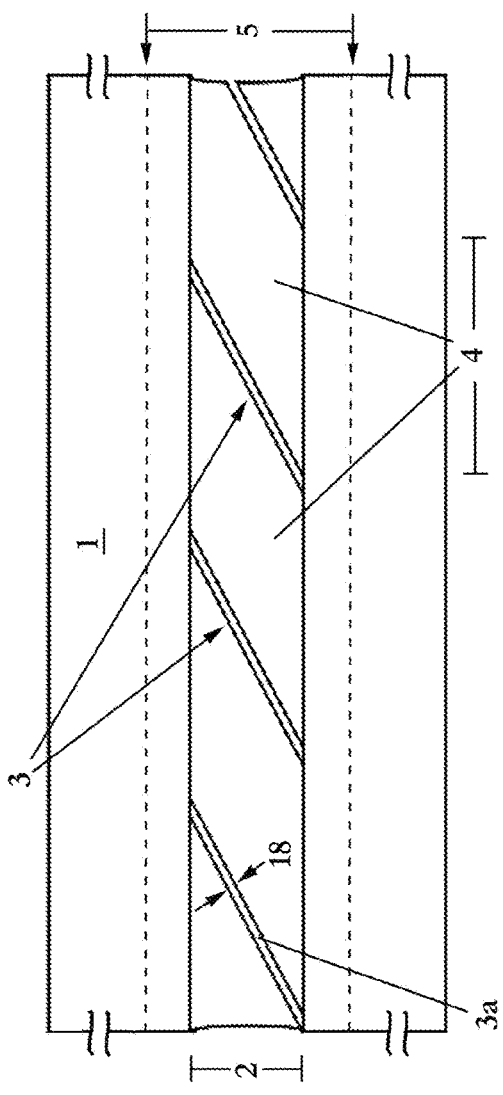
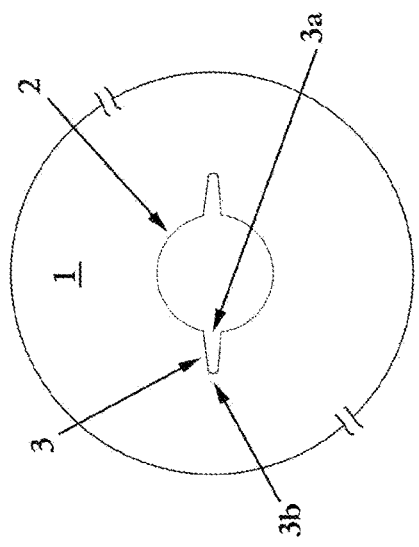
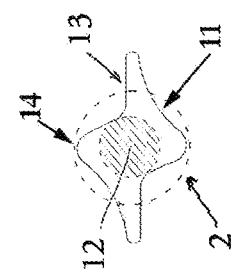
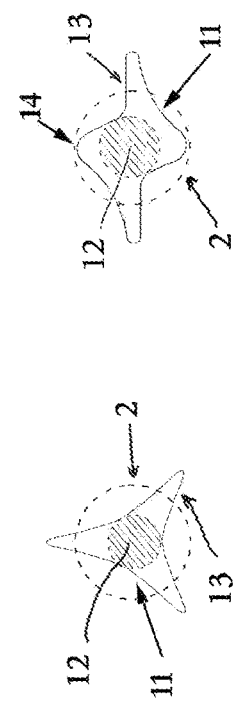
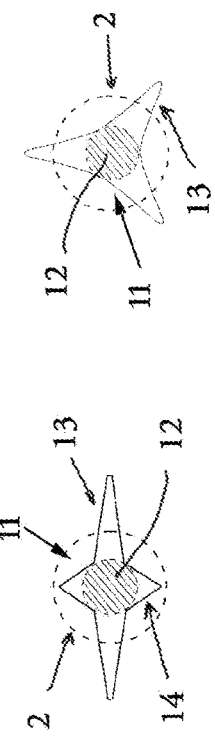
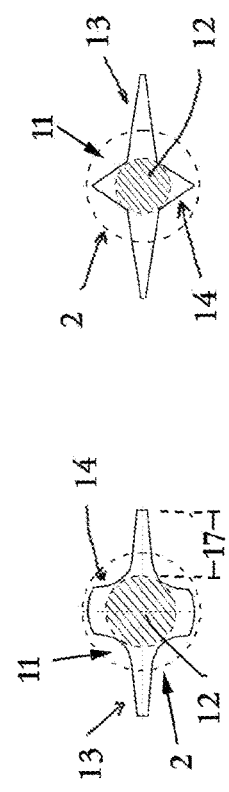

TWISTED HELICALLY SHAPED MEMBER

CROSS REFERENCE TO RELATED APPLICATIONS

This application is a Continuation of U.S. patent application Ser. No. 17/639,363 filed on Mar. 1, 2022, and claims priority to UK Patent Application GB 2112489.6 filed on Aug. 13, 2020, which claims priority to International Patent Application No. PCT/GB2020/051938 filed on Aug. 13, 2020, which claims priority to UK Patent Application GB1912551.7 filed on Sep. 1, 2019, the entire disclosures of which are hereby incorporated by reference and relied upon.

BACKGROUND OF THE INVENTION

Field of the Invention

The present invention is directed to the subject matter of manufacturing ties and rods having a plurality of longitudinal threads by forcing a coil of roll-profiled feed-wire made of steel through a twisting-die made of plastic.

Description of Related Art

Twisting-dies have typically been designed as multiple-segment machined metal components which are assembled to form a hollow die having a plurality of internal helical troughs. The machining, assembly and use of such multi-segment twisting-dies is problematic.

Production of dies having a plurality of internal helical grooves wherein each groove gradually increases in angle from one end of the die to the other is intricate, slow and expensive.

Another problem is that flange-profiled feed-wire is typically wound onto a reel and therefore is coiled rather than straight. The wire has curvatures in two dimensions; the first curvature is caused by the wire running circularly in a coil and the second, a less severe curvature, is caused by the wire running along the breadth or height of the coil, from one end of the reel to the other. These curvatures prevent the leading end of a coil of wire being advanced from the reel directly into and through a die.

A further problem is that flanged steel wire is predisposed to buckling between the force that pushes the wire and the twisting interface within the steel die. This is because a substantial force is required to push flange-profiled steel wire in an axial direction through a twisting die in order to deform it helically. Extreme pressure effectively squeezes out any lubrication at the twisting interface and forces it out of the die at the segment joints or seams, thus intensifying the effects of friction as steel slides on steel. In addition to the direct metal to metal contact causing significant surface damage on one or more of the sliding surfaces, the effect of friction increases the force required to push the wire through the die to beyond critical limits. This causes the wire to buckle such that it becomes jammed within the die or support guide.

Typically, the dry static friction coefficient for steel on steel is $0.8\mu$. Once sliding is initiated friction is reduced; the coefficient of kinetic friction for steel on steel is approximately $0.4\mu$. As higher velocity is introduced into the twisting process in order to twist the steel feed-wire at commercially viable rates, the pressure, heat and the coefficient of friction at the twisting interface will increase.

An example of manufacturing helical connecting devices is disclosed in U.S. Pat. No. 7,269,987 (Ollis). The method includes pushing the leading end of a wire, rod or hollow extrusions straight into and through a helical deformation arrangement comprising a die. The die has a straight entry guide-portion leading to internal helical passageways having a progressive acceleration of helical compound angles. The helical passageways require a set of at least nine helical broaching tools to form more than forty deflection nodes needed to steadily reduce the pitch distance between the helical passageways and a small number of straightener tools. A die formed by broaching a progressive acceleration of helical angles can only be formed as a multi-segment die.

Other examples of using segmental metal twisting-dies to twist steel rods are disclosed in U.S. Pat. No. 497,827 (Sellers) and U.S. Pat. No. 1,549,140 (McCurdy), albeit the subject matter relates to making drill bits and augers.

U.S. Pat. No. 497,827 (Sellers) discloses a method and means of making a drill bit using a multi-part support-guide and a multi-part twisting die into which individual lengths of straight flanged rod are pushed by drive-rollers to give the rod a loose helical twist along a portion of its length, for example, a drill bit with a full 360-degree twist over a distance of 9 inches (228 mm). The sixteen-part twisting die is dismantled in order to withdraw the part-twisted drill bit from the die.

U.S. Pat. No. 1,549,140 (McCurdy) discloses a method and means of making a drill bit or auger using a two-part twisting-die having straight guide grooves leading to milled helical troughs with a progressively decreasing lead angle to gradually reduce the helical pitch distance. The two parts are welded together to form a composite die through which individual straight lengths of a flat bar are driven with a ram to progressively form a helix-shaped drill bit.

Accordingly, the invention seeks to provide a more effective method and means of manufacturing loosely threaded helically-shaped members at commercially viable rates. This can be achieved by twisting flange-profiled feed-wire through a low-friction twisting die. Such a die can be quick, simple and inexpensive to produce and can eliminate leakage, minimise surface damage and relieve the obstacle of buckling.

BRIEF SUMMARY OF THE INVENTION

The invention finds significant utility in manufacturing helically-shaped members, for example in the form of at least one of threaded fasteners, threaded ties and threaded rods by forcing profiled metal feed-wire, which is typically made from steel, having a plurality of longitudinal flanges through a new type of twisting-die. The new twisting-die is made of plastic.

Plastic can be formulated such that the coefficient of friction declines with increasing loads. It can also be formulated to offer excellent abrasion and wear resistance in high-load applications. Plastic twisting dies facilitate faster through-put rates than can be achieved with dies made of steel, they use less force to push flange-profiled feed-wire through the die and they alleviate surface damage to the feed-wire as it slides on the plastic and advances through the die.

Another advantage of using plastic twisting dies to twist steel feed-wire is that the helical grooves within the die do not need to progressively increase in angle from one end of the die to the other. Without being limited by any particular theory, this is thought to be by virtue of the plastic die's elastically compliant constitution. Plastic has a lower modulus of elasticity than steel and is sufficiently compliant to accommodate curvatures on the feed-wire and applied stresses at the twisting interface. The lower modulus of elasticity, combined with the lower coefficient of friction between the selected plastic material and metal, such as steel, permits the twisting of flange-profiled feed-wire within helical grooves where each groove has a substantially uniform helix angle along the entire length of the groove, and hence a substantially uniform lead angle along the entire length of the groove. The plastic die eliminates the need to machine complex helical grooves which gradually tighten as they extend through the length of the die, making the production of the dies quick, simple and inexpensive. The die can be produced from a single piece of material to eliminate the prospect of joint leakage. In use, the plastic die is a viable and cost-beneficial alternative to using a steel die to twist profiled steel feed-wire.

A further advantage of using a plastic die is its capacity to cope with repetitive stop and start twisting, such as may be required when forcing a continuous coil of profiled feed-wire through the die. Alternating 'stop-go' processes result in recurring changes between static and kinetic coefficients of friction at the twisting interface as the feed-wire advances into and through the die. A low-friction twisting die permits the flange-profiled feed-wire to travel smoothly through the plastic die with reduced force, thereby eliminating buckling or jamming of the feed-wire.

The inventors believe that the current invention represents significant improvements in production capability, cost-effectiveness, speed and simplicity.

The essential elements of the inventions are defined by the independent claims and the advantageous embodiments are distinguished in the dependent claims.

In view of the forgoing, according to one aspect there is provided a method for manufacturing helically-shaped members, for example in the form of at least one of: threaded fasteners, thread ties and threaded rods.

The method can include providing profiled feed-wire comprising metal, the feed-wire having a central core and a plurality of longitudinal flanges extending outwards from the core and running parallel to the core.

The method can include providing a die body made of plastic, the die body having an axial cavity formed through the die body and a plurality of internal helical grooves formed in the die body. Each helical groove can extend substantially the whole length of the axial cavity at a substantially uniform helix angle.

The method can include engaging at least some of the flanges within respective internal helical grooves, and forcing the profiled feed-wire in an axial direction through the die body, whereby a plastic surface within at least one of the helical grooves deflects its respective flange thereby forcing the profiled feed-wire to helically deform as it advances through the die body.

The method can include extruding a helically-shaped member, for example in the form of a helically-shaped wire, from the die body. Thus the plastic die twists the feed-wire to produce the helically-shaped wire.

The die body can comprise a single piece of material. Alternatively, the die body can comprise a plurality of pieces of material joined together.

The plastic can comprise synthetic polymer. The die body can be made from a single synthetic polymer or a plurality of synthetic polymers.

The plastic can comprise a self-lubricating plastic. The die body can include an integral lubricant dispersed throughout its matrix.

The plastic can include a polyamide, and preferably can include nylon. The die body can be made of nylon.

The profiled feed-wire can be in the form of a continuous coil wound onto a reel.

In some embodiments each flange extends radially outwards from the core. In some embodiments, at least some of the flanges extend outwards from the core but in a manner that is offset from a centre of the core, for example, the flanges can be arranged sustainably parallel to a radius of the core.

The profiled feed-wire can include steel, and preferably stainless steel and/or high-tensile steel. The profiled feed-wire can be made of steel.

The profiled feed-wire can include stainless-steel having an austenitic crystalline structure. The profiled feed-wire can be made of stainless-steel having an austenitic crystalline structure.

The modulus of elasticity of the feed-wire may be greater than or equal to 180 GPa. Steels typically have a modulus of elasticity around 180 GPa to 200 GPa.

The modulus of elasticity of the feed-wire can be greater than the modulus of elasticity of the die body. The modulus of elasticity of the feed-wire can be at least twenty percent greater than the modulus of elasticity of the die body, and preferably at least one hundred percent greater than the modulus of elasticity of the die body. In some embodiments, the modulus of elasticity of the feed-wire can be at least ten times greater than the modulus of elasticity of the die body.

The axial cavity can have a uniform transverse cross-section along its length. For example, the transverse cross-section can be substantially circular.

The axial cavity can be substantially cylindrical. This shape is well suited to the feed-wire core.

The grooves can extend outwards from the axial cavity. In some embodiments, in a transverse cross-section of the die body, the grooves extend radially outwards from the core.

The method can include helically deforming a leading end of the profiled feed-wire before inserting it into the twisting-die. This can reduce wear on the die body. For example, this step can be performed manually, and may include the use of a separate die and/or other tools.

The die body can have a cylindrical shape. An outer diameter of the die body can be at least three times a circumscribed diameter of the profiled feed-wire. This helps to maintain the structural integrity of the die body during an extrusion process.

The plurality of longitudinal flanges can include a plurality of major longitudinal flanges and a plurality of minor longitudinal flanges. Each major flange can have a greater depth than the depth of each minor flange. The flange depth is measured in a generally radial direction from a root of the flange to a tip of the flange. Each minor flange can be located between two major flanges. Each major flange can be inserted into a respective helical groove in the die body. Each minor flange can be inserted into the axial cavity. Thus in some embodiments the die body can have fewer helical grooves than the feed-wire has flanges. The number of grooves typically matches the number of major flanges.

The depth of the minor flanges and the size (diameter) of the axial cavity can be dimensioned to provide a clearance between an axial cavity wall and peripheral portions of the minor flanges.

An inscribed diameter of the axial cavity within the die body can be at least 30% greater than an inscribed diameter of the central core of the profiled feed-wire. This helps to accommodate the physical changes that occur to the feed-wire during the twisting process.

The profiled feed-wire can be curved in form.

The method can include winding the die body on to the leading end of a coil of feed-wire and locking the pre-engaged die body against rotation with a die holder. This helps to prevent the die body from wearing.

The method can include driving the profiled feed-wire through the die body by powered drive rollers.

The method can include temporarily halting rotation of the powered drive rollers during an extrusion process, and subsequently restarting the powered drive rollers.

The profiled feed-wire can be twisted through at least one full rotation within the confines of the die body, and preferably can be twisted through more than one full rotation within the confines of the die body. For example, the feed-wire can be twisted through greater than or equal to 1.25 rotations within the confines of the die body. Each helical groove applies turning moments to its respective flange, which causes the axial core to twist about its longitudinal axis, thereby helically deforming the feed-wire.

In some embodiments, the profiled feed-wire is twisted through less than or equal to 10 full rotations within the confines of the die body.

The coefficient of friction for steel sliding on the plastic used to make the die body can be less than the coefficient of friction of steel sliding on steel. This provides a lower friction arrangement than making a die out of steel, and thus requires less force to push the feed-wire through the plastic die body.

The plastic used to make the die body can have a static coefficient of friction on steel of less than or equal to approximately 0.3μ. The plastic used to make the die body can have a kinetic coefficient of friction on steel of less than or equal to approximately 0.2μ.

The method can include driving the profiled feed-wire through the die body at a throughput rate in the range 100 mm to 500 mm per second.

The helically-shaped wire that is extruded from the die body can have a greater mass per unit length than the profiled feed-wire that can be fed into the die body. The transverse cross-sectional area of the profiled feed-wire can be at least 10% less than the cross-sectional area of the stock-wire, and can be at least 12% less than the cross-sectional area of the stock-wire.

The method can include cutting the helically-shaped wire to form, for example, at least one of: threaded fasteners, threaded ties and threaded rods. The helically-shaped members each have an axial core and a plurality of longitudinal helical threads.

The method can include cutting the helically-shaped wire after the powered drive rollers have been halted. The method can include a controller synchronising operation of a cutting device with the powered drive rollers. The controller can be arranged to halt rotation of the drive rollers and subsequently actuate the cutting device to cut the extruded helically-shaped wire.

The method can include a preparatory step of providing stock-wire. The stock-wire can have a substantially circular transverse cross-section. The method can include progressively squeezing the stock-wire between shaping rollers on a plurality of occasions such that the transverse cross-sectional shape of the stock-wire is gradually plastically deformed into the transverse cross-section of the profiled feed-wire, without cutting or shearing the surface of the wire.

The tensile strength of the profiled feed-wire can be in the range 1.7 to 2.3 times the tensile strength of the stock-wire.

The profiled feed-wire can have an ultimate tensile strength in the range 850 MPa to 1380 MPa.

At least one of the flanges can be work-hardened. The or each work-hardened flange extends outwards, and in some embodiments radially outwards, from a softer core.

The hardness of at least one flange can be in the range 25 to 45 on the Rockwell C scale.

At least one, and preferably more than one, flange can be elongate in transverse cross-section.

At least one, and preferably more than one, flange can have a greater hardness than the die body.

At least one, and preferably more than one, flange can taper along its depth from a wider portion towards a root portion to a narrower width at a tip portion.

The transverse cross-section of the flanges can vary in depth, width or shape.

The plastic die body can have characteristics according to the second aspect of the invention.

The die body can be formed in a preceding step according a third aspect of the invention.

The helically-shaped members can have characteristics according to the fourth aspect of the invention.

According to a second aspect, there is provided a twisting-die that is suitable for twisting profiled feed-wire made of steel. The twisting-die includes: a die body made of plastic. The die body can include a substantially axial cavity formed through the die body. The die body can include a plurality of internal helical grooves formed within the die body. Each helical groove can extend along substantially the whole length of the axial cavity at a substantially uniform helix angle.

The die body can comprise a single piece of material. Alternatively, the die body can comprise a plurality of pieces of material.

The plastic can comprise synthetic polymer. The die body can be made from a single synthetic polymer or a plurality of synthetic polymers.

The plastic can comprise a self-lubricating plastic. The die body can include an integral lubricant dispersed throughout its matrix.

The plastic can include a polyamide, and preferably can include nylon. The die body can be made of nylon.

The plastic used to form the die body can have a static coefficient of friction on steel of less than or equal to approximately 0.3μ.

The plastic used to form the die body can have a kinetic coefficient of friction on steel of less than or equal to approximately 0.2μ.

The die body can include reinforcement. The die body can include microsphere reinforcement. The die body can include fibre reinforcement. The die body an include at least one of glass fibres, carbon fibres, basalt fibres and aramid fibres.

The hardness of the die body can be in the range 70 to 95 on the Shore D scale.

The die body can be made from plastic having a modulus of elasticity that can be less than or equal to 18 GPa, preferably less than or equal to 15 GPa, more preferably less than or equal to 10 GPa, and more preferably still less than or equal to 6 GPa.

Alternatively, the die body can be made from reinforced plastic having a modulus of elasticity that can be less than or equal to 150 GPa, preferably less than or equal to 100 GPa, more preferably less than or equal to 50 GPa.

At least one, and preferably each one, of the internal grooves can turn through at least one full rotation within the confines of the die body, and preferably can turn through more than one full rotation within the die body.

At least one, and preferably each one, of the internal grooves within the die body can turn through at least one full rotation over an axial distance in the range 20 mm to 75 mm. In some embodiments, the grooves turn through a maximum of 4 revolutions over an axial distance in the range 20 mm to 75 mm.

Each helical groove can extend outwardly from the axial cavity. Each helical groove can be contiguous with the cavity. Each helical groove can have a root portion adjacent the axial cavity. Each helical groove can be open at the root portion. Each helical groove can have a tip portion distal from the axial cavity. Each helical groove can be closed at the tip portion.

In some embodiments, when the die body is viewed in transverse cross-section, at least one, and preferably each one, of the internal grooves extends radially outwards from the axial cavity. In other embodiments, when the die body is viewed in transverse cross-section, at least one, and preferably each one, of the internal grooves extends parallel to a radius of the axial cavity.

In some embodiments, when the die body is viewed in transverse cross-section, at least one, and preferably each one, of the internal grooves can taper radially from the root portion adjacent the cavity to the tip portion distal from the axial cavity.

In some embodiments, when the die body is viewed in transverse cross-section, the radial depth of at least one, and preferably each one, of the internal grooves can be less than the radius of the axial cavity. In some embodiments, when the die body is viewed in transverse cross-section, the radial depth of at least one, and preferably each one, of the internal grooves can be less than or equal to 4 mm.

In some embodiments, when the die body is viewed in transverse cross-section, the cross-sectional area of at least one, and preferably each one, of the internal grooves can be approximately 7.5% or less of the inscribed cross-sectional area of the cylindrical cavity.

In some embodiments, when the die body is viewed in transverse cross-section, the cross-sectional area of at least one, and preferably each one, of the internal grooves can be less than 8 square millimetres.

When the die body is viewed in longitudinal cross-section, the groove openings in the wall of the cavity can be spaced apart at an axial distance in the range 10 mm to 35 mm.

When the die body is viewed in longitudinal cross-section, the length of each land located between one internal groove and the next internal groove can be greater than or equal to 12 times the width of the groove opening.

The die body can be cylindrical, and an outer diameter of the die body can be greater than three times a circumscribed diameter of the helical grooves.

The axial cavity can have a uniform transverse cross-section along its length. The axial cavity can have a circular transverse cross-section. The axial cavity can be substantially cylindrical. An inscribed diameter of the substantially cylindrical cavity can be in the range 2 mm to 9 mm.

The die body can have a countersink at one end of the axial cavity. The die body can have a countersink at each end of the axial cavity.

The plastic twisting die can be formed according to the third aspect of the invention.

According to a third aspect, there is provided a method of producing a plastic twisting-die that is suitable for twisting profiled feed-wire made of steel. The method can include providing a body made from plastic, the body having an axial cavity. The method can include providing a tap having an axial core and a plurality of helical threads extending along the axial core. The method can include aligning the axial core of the tap with the axial cavity. The method can include the plurality of helical threads cutting a plurality of internal helical grooves into the body. Each internal helical groove can extend substantially the whole length of the cavity. Each internal helical groove can have a substantially uniform helix angle. The method can include removing the tap from the body.

Each helical thread can have a lead angle in the range 50 degrees to 70 degrees.

Each helical thread can have, in transverse cross-section, an angle defined by the apex at the tip of a thread in the range 5 degrees to 30 degrees.

The plastic can comprise synthetic polymer. The die body can be made from a single synthetic polymer or a plurality of synthetic polymers.

The plastic can comprise a self-lubricating plastic. The die body can include an integral lubricant dispersed throughout its matrix.

The plastic can include a polyamide, and preferably can include nylon. The die body can be made of nylon.

The tap can turn through at least one full rotation within the confines of the die body, thereby cutting internal helical grooves that turn through at least one full rotation within the die body.

The tap can turn through more than one full rotation within the confines of the die body, thereby cutting internal helical grooves that turn through more than one full rotation within the die body.

The leading end of the tap can be shaped to help centre the tap to a longitudinal axis of the axial cavity, at one end of the die. The leading end of the tap can narrow in width, for example, tapered/rounded into a point or chisel tip.

The method can include forcing the tap in an axial direction into the plastic body. For example, a portion of helically-shaped wire extruded from a plastic die according to the invention can be adapted for use as a thread-cutting tap for forming the plurality of helical grooves in a further plastic body, to form a new plastic die, which itself can be used to produce further helically-shaped wire.

Typically, an external rotational force is not applied to the tap when forcing the tap into the body. For example, the tap can be percussively driven or pressed into the body. The body is typically restrained from rotating when the tap is percussively driven or pressed into the die body.

The method can include forcing the body in an axial direction on to the tap. In some methods, the body can be percussively driven or pressed on to the tap. The tap is typically restrained from rotating. Typically, an external rotational force is not applied to the body when forcing the body on to the tap.

The method can include forming a countersink in at least one end of the axial cavity.

The tap can be formed in a preceding step according to the first aspect. That is, the tap can be formed from helically-shaped wire extruded from the plastic die in the first aspect.

According to a fourth aspect there is provided a helical member having an axial core and a plurality of helical threads extending along the length of the axial core. The helical threads can be arranged such that any variation in lead measurements along the length of at least one of the plurality of helical threads, can be less than a variation in pitch measurements along the lengths of the helical threads. The helical threads can extend along substantially the whole length of the axial core. Each helical thread can have a substantially uniform helix angle.

The variation of the lead is calculated by subtracting the minimum lead measurement from the maximum lead measurement along the length of the helical thread measured. The variation of the pitch is calculated by subtracting the minimum pitch measurement from the maximum pitch measurement along the lengths of the threads.

The difference between the variation in pitch and lead can provide a useful mechanical property in some applications. For instance, it can assist with material such as mortar providing a mechanical interlock with the plurality of helical threads.

The variation in the lead measurements of at least one of the helical threads can be less than half the variation in pitch measurements.

The helical member can have an ultimate tensile strength in the range 850 MPa to 1380 MPa The hardness of at least one helical thread can be in the range 25 to 45 on the Rockwell C scale.

The helical member can be in the form of a fastener, tie or rod. In some arrangements, the helical member can be arranged to be percussively driven into a substrate. For example, the leading end of the helical member can be formed into a drivable tip, that can be driven into wood, mortar, masonry or insulation.

The helical member can include a plurality of major helical threads. The helical member can include a plurality of minor helical threads. Each major thread can have a greater depth than each minor thread. The thread depth is measured in a generally radial direction. Each minor thread can be located between two major threads. The helical member can have a tip at each end. For example, the helical member can have a driving tip at one end and a tapered tip at another end. The tapered tip helps percussive driving forces to be concentrated on the axial core of the member, thereby assisting to drive the helical member into a substrate.

The helical member can include a shank portion at one end. The shank portion can be formed by removing a portion of its major helical threads at one end of the member. The shank portion can have substantially parallel sides along at least part of the length of the shank portion. The shank portion may have a maximum diameter that is more than 50% of the maximum diameter of the helical member. The shank portion may have a maximum length that is less than or equal to the length of a pitch distance.

The shank portion can include a tapered portion at one end such that percussive driving forces can be concentrated on the core of the member.

The helical member can include a head. For example, the helical member may have a head that is attached to or formed at one end of the member.

The axial core can have a transverse cross-section that is less than or equal to two-fifths of a transverse circumscribed cross-sectional area of the helical threads.

BRIEF DESCRIPTION OF THE SEVERAL VIEWS OF THE DRAWINGS

Embodiments of the present invention will now be described by way of example only, with reference to the accompanying drawings in which:

FIG. 1 is an end view of a plastic die according to the invention;

FIG. 2 is a longitudinal sectional view of the die of FIG. 1, showing internal helical grooves and the land between the grooves;

FIGS. 3A to 3D are transverse cross-sectional views of various profiled feed-wires that are suitable for twisting into helically-formed members by means of respective plastic dies arranged in accordance with the invention;

DETAILED DESCRIPTION OF THE INVENTION

The Plastic Twisting Die

Figure 4:
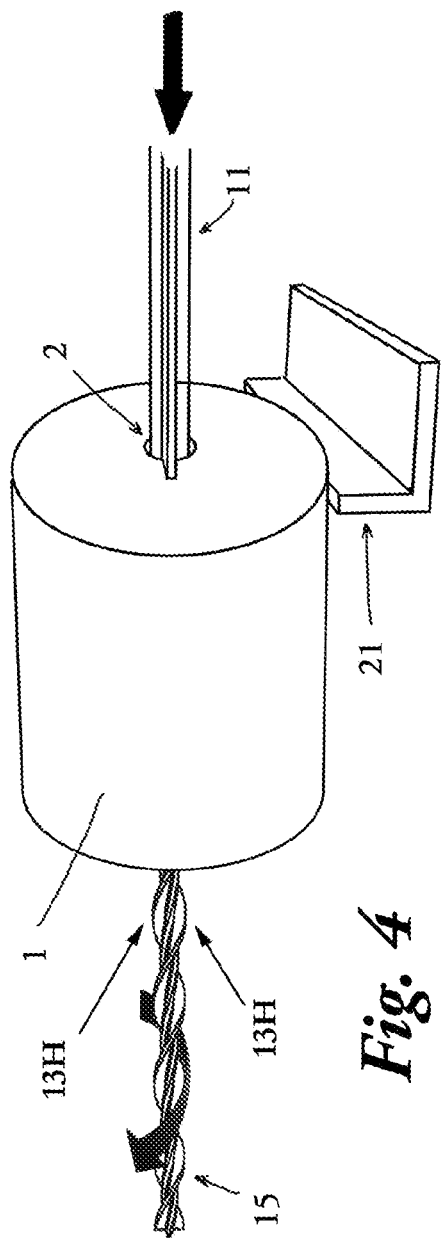
FIG. 4 shows a profiled feed-wire advancing through the plastic die of FIG. 1 to produce a helically-shaped wire.

FIG. 1 is a diagrammatic end view of a plastic die 1 according to the invention. The die 1 is arranged to twist metallic profiled feed-wire (see FIGS. 3A to 3D) as it passes through the die 1 to form a helical wire having a plurality of helical threads.

The die 1 is typically made from a single piece of plastic, for example, a cylindrical or cuboid block of plastic, which is referred to as the die body. The block can be moulded, or may be cut from stock material. The die 1 is has a longitudinal axis, and is preferably elongate. The die 1 includes an axial cavity 2, such as a substantially cylindrical axial cavity 2. The cavity 2 extends in a longitudinal direction of the die 1 for the full length of the die, and is typically formed along a central longitudinal axis. The cavity 2 is open at each end. The cavity 2 typically has an inscribed diameter in the range 2 mm to 9 mm. The die 1 includes a plurality of helical grooves 3. Each groove 3 extends radially outwards from the axial cavity 2. Each groove 3 extends in a helical fashion along the full length of the axial cavity 2. Typically, each helical groove 3 turns through more than one full rotation about the axial cavity 2. The helical grooves 3 are spaced apart from one another about the circumference of the axial cavity 2. Each groove 3 has a root portion 3a adjacent the axial cavity 2. The root portion 3a of each helical groove 3 is open to, and contiguous with, the axial cavity 2. Each groove 3 has a tip portion 3b distal from the axial cavity. Each tip portion 3b is closed.

In the example shown in FIG. 1, the die 1 includes two helical grooves 3. The helical grooves 3 are arranged diametrically opposite to one another about the axial cavity 2. Optionally, each groove 3 can be tapered in cross-section, such that the groove 3 is wider at the root portion 3a and is narrower at the tip portion 3b.

The plastic used to form the die preferably has, under normal load, a coefficient of static friction on steel of less than approximately 0.3μ. The plastic used to form the die preferably has, under normal load, a coefficient of kinetic friction for steel on plastic of less than approximately 0.2μ.

The die 1 can be made from a self-lubricating plastic, or at least operative portions of the die 1 can be made from a self-lubricating plastic. For example, at least operative parts of the die 1, and typically the whole die 1, can be made from a polyamide, such as nylon. Beneficially, the use of a self-lubricating plastic may considerably increase pressure-velocity capabilities and may improve wear resistance of up to ten times when compared to plastics that are not self-lubricating. Improved wear characteristics ensure excellent retention of physical properties.

The modulus of elasticity of the plastic die material is typically less than or equal to 18 GPa, preferably less than or equal to 10 GPa, and more preferably is less than or equal to 6 GPa.

Optionally, the plastic die 1 may include reinforcement. For example, the die 1 can include fibre or microsphere reinforcement, such glass, carbon, basalt or aramid reinforcement. In this case, the modulus of elasticity of the die body can be substantially higher. For example, carbon fibre reinforced plastic can have a modulus of elasticity of around 150 GPa. Glass fibre reinforced plastic can have a modulus of elasticity of around 20 GPa.

FIG. 2 represents the plastic twisting die of FIG. 1 as it would appear if cut lengthways to show its internal structure. FIG. 2 shows plastic lands 4 which form the internal wall of the cylindrical cavity are intersected by the helical grooves 3, each groove having a substantially uniform helix angle along substantially the full length of the die 1.

The dashed lines 5 represent the depth of the helical grooves 3 at their outer periphery or tips 3b. Typically, the helical grooves 3 extend up to a maximum depth of approximately 4 mm into the plastic die body 1.

The plastic die 1, which may also serve as a straightening die, needs to be balanced in bulk, elastic compliance and strength by which to absorb loads and resist failure as pressure is exerted at the twisting interface. To provide high load-bearing qualities and good dimensional stability, the plastic used to form the die 1 preferably has a hardness in the range 70 to 95 on the Shore D scale. The dimensions of the die body 1 are sufficient to prevent failure of the die 1, for example to prevent it from cracking. Preferably die body 1 is cylindrical and has an outer diameter that is greater than three times the circumscribed diameter of the grooves 3. The width 18 of each one of the openings in a newly manufactured die is typically less than or equal to 3 mm, and preferably less than or equal to 2 mm. The width 18 of the opening is measured in a direction that is perpendicular to the helix angle (see FIG. 2). The width 18 of the opening can increase with use due to wear. The distance between adjacent groove openings at the root portion 3b in a longitudinal axis direction, and hence the axial length of the land 4 between adjacent groove openings, is typically in the range 10 mm to 35 mm. In some arrangements, the axial length of the land 4 between adjacent groove openings at the root portion 3b may be greater than or equal to 12 times the width of the groove opening at the root portion 3b. The axial length of land 4 between adjacent groove openings at the root portions 3b can vary along the length of the die in some embodiments, for example due to variations in pitch along the length of a tap, which forms the helical grooves in the die body. In other embodiments, the axial length of land 4 is substantially uniform along the length of the die.

The Feed-Wire

FIGS. 3A to 3D are cross-sectional views of examples of feed-wires 11 that can be twisted into helical forms when forced through respective plastic dies arranged in accordance with the invention. Typically, the feed-wires 11 include an axial core 12 and at least two longitudinal flanges 13. Each longitudinal flange 13 extends outwards from the axial core 12, and typically extends outwards in a substantially radial direction from the axial core 12. However, in some embodiments the flanges 13 extend outwards from the core 12 substantially parallel to a radius. The feed-wires 11 are typically flange-profiled feed-wires 11, and preferably profiled feed-wires 11 created by a rolling process acting on a stock-wire (not shown). Preferably, the feed-wires 11 are made from metal, and preferably a metal having a high tensile strength. For example, the feed-wires 11 can be made from steel, and preferably stainless steel. A particularly preferred material is a stainless steel having an austenitic crystalline structure.

FIG. 3A shows the cross-sectional contour of a feed-wire 11 which can be twisted into a helically-shaped member, in the form of a helically-shaped wire 15, when forced in an axial direction through the die 1 of FIG. 1. The feed-wire 11 includes a central axial core 12. The feed-wire 11 includes two major flanges 13 extending radially outwards from the core 12. The two major flanges 13 are arranged diametrically opposite to one another about the core 12. Each major flange 13 extends along the full length of the core 12. The feed-wire 11 includes two minor flanges 14 extending radially outwards from the core 12. Each minor flange 14 extends along the full length of the core 12. The two minor flanges 14 are arranged diametrically opposite to one another about the core 12. The minor flanges 14 are located substantially equidistantly between the major flanges 13. The minor flanges 14 are arranged substantially perpendicularly to the major flanges 13. The depth 17 of each major flange 13 is greater than the depth 17 of each minor flange 14. Depth 17 is measured in a radial direction, from a root of the flange to a tip of the flange (while FIG. 3A illustrates flange depth for major flanges 13, it will be appreciated that the measurement is also applicable to minor flanges 14). The circumferential width of each minor flange 14 is greater than the circumferential width of each major flange 13. Thus the major flanges 13 are relatively slender in transverse cross-section since they have a greater depth 17 and narrower width, and the minor flanges 14 are relatively squat in transverse cross-section since they have a greater width and lesser depth 17.

Each major flange 13 is tapered in transverse cross-section, such that the flange 13 is wider at the root portion and is narrower at the tip portion.

It can be seen by comparing the transverse cross-section of the feed-wire 11 to the die of FIG. 1 that the major flanges 13 are well suited to fitting within the helical grooves 3 in the die, whilst the core 12 and the minor flanges 14 are well suited to fitting within the cylindrical axial cavity 2, which is represented by the dashed circular line in FIG. 3A.

FIG. 3B shows a cross-section of a feed-wire 11 having a central axial core 12, two major pointed wedge-shaped flanges 13 extending radially outwards from the axial core 12 and two pointed wedge-shaped minor flanges 14 extending radially outwards from the axial core 12. Each major flange 13 extends along the full length of the core 12. Each minor flange 14 extends along the full length of the core 12. The two major flanges 13 are arranged diametrically opposite to one another about the core 12. The two minor flanges 14 are arranged diametrically opposite to one another about the core 12. The minor flanges 14 are located substantially equidistantly between the major flanges 13. The major flanges 13 are arranged substantially perpendicularly to minor flanges 14. The minor flanges 14 have a different shape from the major flanges 13.

When the feed-wire 11 of FIG. 3B is used with a plastic die, the transverse cross-sectional shape of each groove 3 is matched to the shape of the major flanges 13 when manufacturing the die 1. The major flanges 13 will then be suited to fitting within the grooves 3 in the die, whilst the core 12 and the minor flanges 14 are well suited to fitting within the cylindrical axial cavity 2, which is represented by the dashed circular line in FIG. 3B.

FIG. 3C shows a cross-section of a feed-wire 11 having a central axial core 12 and three major flanges 13 extending radially outwards from the axial core 12. Each major flange 13 has a rounded tip, and substantially the same size and shape. Each major flange 13 has a radiused portion at its root and tapers to the tip. In this example, though not limited to feed-wires having three major flanges, the major flanges 13 are unevenly distributed about the core 12, such that the transverse cross-sectional profile is selectively rotationally asymmetric.

When the feed-wire 11 of FIG. 3C is used with a plastic die, the die includes 3 helical grooves 3 distributed about the axial cavity 2. The transverse cross-sectional shape of each groove 3 is matched to the shape of the major flanges 13 when manufacturing the die 1. The major flanges 13 will then be suited to fitting within the grooves 3 in the die, whilst the core 12 is well suited to fitting within the cylindrical axial cavity 2, which is represented by the dashed circular line in FIG. 3C.

When a rotationally asymmetric feed-wire is twisted, it can form a helically shaped member having peak to peak pitch measurements that vary or alternate along the length of the wire. Notwithstanding the non-uniform pitch measurements, each thread of the helically shaped member can have a substantially uniform lead measurement along substantially the full length of the wire.

FIG. 3D shows a feed-wire 11 having a central axial core 12, two major flanges 13 extending outwards from the core 12, and two minor flanges 14 extending outwards from the core 12. Each major flange 13 extends along the full length of the core 12. Each minor flange 14 extends along the full length of the core 12. The minor flanges 14 are located between the major flanges 13.

The transverse cross-section of the feed-wire is rotationally symmetrical, however is reflectively non-symmetrical. That is, if the wire 11 is rotated through 180 degrees about its central longitudinal axis, a first one of the major flanges 13 would occupy the same place, and have the same shape as a second one of the major flanges 13, and likewise a first one of the minor flanges 14 would occupy the same place, and have the same shape as a second one of the minor flanges 14. However, no reflective plane of symmetry exists in transverse cross-section. This is because the each of the major and minor flanges 13,14, while extending outwards from the core 12 does not extend exactly along a radius but rather is offset from the radius, and extends parallel to the radius. Furthermore, each major flange 13 is non-symmetrical about its centre line, and each minor flange 14 is non-symmetrical about its centre line.

The depth 17 of each major flange 13 is greater than the depth 17 of each minor flange 14. The circumferential width of each minor flange 14 is greater than the circumferential width of each major flange 13. Thus the major flanges 13 are relatively slender since they have a greater depth 17 and narrower width and the minor flanges 14 are relatively squat since they have a greater width and lesser depth 17.

When the feed-wire 11 of FIG. 3D is used with a plastic die, the transverse cross-sectional shape of each grooves 3 is matched to the shape of the major flanges 13 when manufacturing the die 1. The major flanges 13 will then be suited to fitting within the grooves 3 in the die, whilst the core 12 and the minor flanges 14 are well suited to fitting within the cylindrical axial cavity 2, which is represented by the dashed circular line in FIG. 3D.

The flanged feed-wires 11 of FIGS. 3A to 3D may be formed by taking a coil of stock wire having a circular transverse cross-section and shaping the stock wire, as it is wound from one reel to another. The process involves progressively squeezing the stock wire between shaping rollers on a plurality of occasions such that the substantially circular cross-sectional shape of the stock wire is gradually plastically deformed into the desired cross-sectional profile without cutting or shearing the surface of the wire. The process produces a coil of profiled feed-wire having a plurality of longitudinal flanges extending outwards from its central core and running parallel to it.

In the process of deforming the stock-wire into feed-wire 11, the cross-sectional area of the wire reduces whilst the circumscribed diameter of the wire increases. For example, for some wires the cross-sectional area reduces by at least 12.5%, to 40 square millimetres or less, whilst the circumscribed diameter of the wire increases by a value in the range 45% to 85%.

The forming process work hardens the surfaces of the major flanges such that they are harder than the plastic die material. The tensile strength of the wire, which is typically less than 600 Mps in its circular stock form, increases typically by a factor of around 1.7 to 2.3 in its profiled form, thereby delivering profiled feed wire having an ultimate tensile strength in the range 850 MPa to 1380 MPa.

It will be appreciated that the rolling process work-hardens the elongate flanges 13 such that they are harder than the central core 12. As a result, the softer core 12 of the feed-wire 11 remains sufficiently malleable to be twisted whilst the hardened flanges 13 will not fold, crack or break during the twisting process.

The invention is not limited to twisting feed-wire 11 having the example cross-sections shown in FIGS. 3A to 3D, or any combination of features taken therefrom. The examples, shown are merely for illustrative purpose. The method and means of the current invention would be suitable for any profiled metallic feed-wire having a plurality of roll-profiled longitudinal flanges including a rhombus and including those where, in transverse cross-section, one flange is selectively adapted to be different in orientation, depth 17, width and/or shape to at least one other flange. It is possible that the die 1 can also be used with feed-wires 11 that are produced by a different forming process.

Twisting Profiled Feed-Wire Using a Plastic Die

FIG. 4 is a schematic diagram illustrating the method of the current invention in which a profiled 1 feed-wire 11, which is typically made from steel, is forced in an axial direction through the plastic die 1 and is extruded from the die 1 in the form of a helical shaped wire 15.

In high-pressure applications, steel sliding on a self-lubricating synthetic polymer plastic, such as nylon, has a lower coefficient of friction than that of steel sliding on steel. As mentioned previously, the plastic material used to form the die 1 can have a coefficient of static friction on steel of less than approximately 0.3μ and, under normal load, a coefficient of kinetic friction for steel on plastic of less than approximately 0.2μ.

The cavity 2 within the plastic die 1 has an inscribed diameter that is 25% to 50% less than the circumscribed diameter of the profiled feed-wire 11. The arrangement is such that only the major flanges 13 are received in the internal grooves 3, and a clearance is provided between the minor flanges 14 and cavity 2 wall.

Optionally, prior to inserting the feed-wire 11 into the main manufacturing die 1, it can be beneficial to pre-treat the leading end of the feed-wire 11. For example, in some instances it can be desirable to heat the leading end of feed-wire 11 to assist with the twisting process. It can also be helpful to pre-twist a leading end of the feed-wire 11 to create an at least partially formed section of helical wire 15 at the leading end. This makes it easier to insert the feed-wire 11 into the die 1, and reduces wear of the die at the initial engagement. Pre-twisting a leading end of the feed-wire 11 can be performed manually, and may include heating the leading end of the wire. In some arrangements, a second die (not shown) can be used to pre-twist the wire. The second die is separate from the main twisting die 1. The second die can have an axial cavity and helical grooves formed therein, in a similar arrangement to the axial cavity 2 and helical grooves 3 formed in the main twisting die 1, but the second die is used only for the purposes of preparing the leading end of the wire for insertion into the main twisting die 1.

When the feed-wire 11 is ready, the leading end of the feed-wire is inserted into a leading end of the die 1, such that the core 12 and minor flanges 14 are inserted into the cavity 2, and the major flanges 13 are inserted into respective grooves 3. For example, the die 1, can be wound on to and pre-engaged with the leading end of the feed-wire 11, and is then fixed in place by a die holder 21 to lock the die 1 against rotation during the twisting process.

The feed-wire 11 is driven in an axial direction through the die 1, whereupon the feed-wire 11 is twisted about its longitudinal axis to helically shape the feed-wire 11. An active surface of an outer radial portion of each major flange 13 is deflected by an active surface of a respective helical groove 3, thereby creating turning moments acting on the major flanges 13 which cause the axial core 12 to plastically deform in a helical manner. A helically-shaped wire 15 is extruded from a discharge end of the die 1.

The outer radial portion of each major flange 13 is, in transverse cross-section, a portion measuring approximately 30% to 70% of the radial depth of the major flange 13 as measured from its tip towards the inscribed circumference of the core 12.

The extruded helically-shaped wire 15 is smaller in circumscribed diameter than the feed-wire 11 from which it was produced. This is because the major flanges 13 on the feed-wire 11 are stressed into tension as they are stretched to extend both around and along the longitudinal core 12 of the wire. This flange-elongation results in the extruded helical wire 15 having a circumscribed diameter that is up to approximately 2.5% less than the circumscribed diameter of the feed-wire 11.

The tensile forces imparted to the stretched major flanges 13 result in a reactive axial compression force being applied along the longitudinal core 12 of the wire. This compression reduces the overall length of the twisted wire 15 such that the wire extruded from the die 1 has a greater mass per unit length than the feed-wire 11. The helical wire 15 is approximately 2% to 5% heavier than the feed-wire 11 of the same length.

In order to accommodate the physical changes that occur to the feed-wire 11 during the twisting process the inscribed diameter of the cavity 2 within the die is typically at least 30% greater than the inscribed diameter of the central core 12 of the profiled feed-wire 11.

Figure 5:
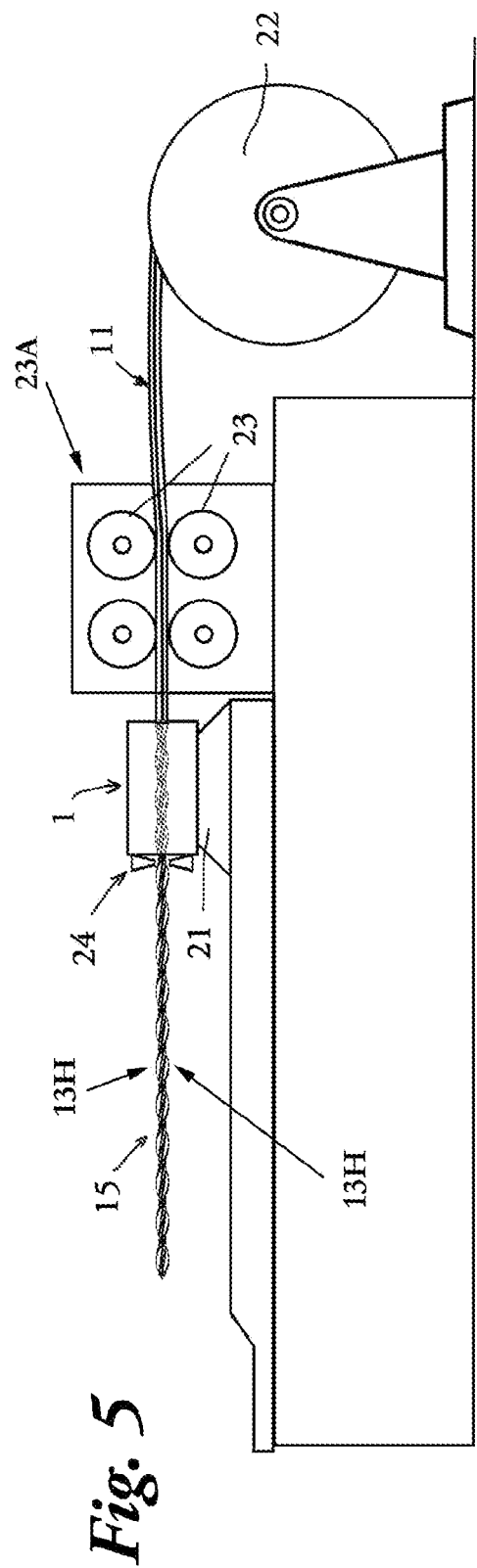
FIG. 5 is a schematic view of a production system including the plastic die according to FIG. 1, that is arranged to produce helically-shaped wire from a profiled feed-wire.

FIG. 5 is a schematic diagram showing a manufacturing system according to the invention. The manufacturing system includes profiled feed-wire 11, a reel 22, a feed mechanism 23a, the die 1, and a cutter 24. The feed-wire 11 is in the form of a continuous coil of wire and is stored on the reel 22. The reel 22 typically contains 100 kg to 800 kg of feed-wire 11, which depending on the gauge and composition of the wire 11, represents around 500 m to 20,000 m of profiled feed-wire 11.

In its storage state, the feed-wire 11 is not straight; it is curved in two dimensions by virtue of it being wound into a coil and stored on the reel 22.

During a set-up, the feed-wire 11 is inserted into the leading end of the die 1 such that the major flanges 13 are engaged within the die's internal helical grooves 3. The die 1 is wound on to the leading end of the feed-wire 11, thereby twisting the leading portion of the feed-wire 11. The die 1 is then rotationally locked in a stationary position in the die holder 21.

The feed mechanism 23 includes a plurality of drive rollers 23. The drive rollers 23 are driven by a suitable drive means, for example by an electric motor, optionally via a transmission system. The drive rollers 23 are arranged to pull the feed-wire 11 from the reel 22 and drive through the die 1. The curved form of the feed-wire 11 beneficially helps the drive rollers 23 to grip the feed-wire 11 without slippage. The drive rollers 23 push the feed-wire 11 in an axial direction through the plastic die 1 without the need for sets of straightening rolls. The major flanges 13 act as radial lever arms which are deflected within the internal helical grooves 3 by a plastic surface of the die as they advance through die 1. The die 1 twists and straightens the feed-wire 11 as it passes through the die 1, and the wire is extruded from a discharge end of the die in the form of a helical wire 15 having a plurality of longitudinal helical threads, and typically a high-tensile helical wire 15.

The feed-wire 11 is twisted at least one full rotation within the confines of the die 1. This helps to substantially straighten the curved feed-wire 11 and to mitigate any helical spring-back recovery which may otherwise result in the loosening of the helix as it is discharged from the die 1. Typically, the die 1 is arranged to twist the feed-wire 11 through an angle in the range one to ten full rotations within the confines of the die 1. In some embodiments, the die 1 is arranged to twist the feed-wire 11 through an angle in the range one and a quarter to twelve and a half rotations within the confines of the die 1. The low-friction plastic die 1 permits the feed-wire 11 to be driven smoothly through the twisting die 1 at a throughput rate of around 0.1 to 0.5 metres per second, enabling mass production of high-tensile helical shaped wire 15 at commercially viable rates.

The drive mechanism 23 is adapted to stop and restart the drive rollers 23 intermittently to allow a cutting arrangement 24 to cut or crop the helical wire 15 to the desired length as substantially the whole reel of wire 11 is fed through the straightening and twisting die 1 with minimal wastage. Optionally, this can be done automatically, for example by an electronic controller, which synchronises operation of the feed mechanism 23 and the cutter 24. The low-friction die 1 is well suited to overcoming the alternating cycles of static and kinetic friction as sequential lengths of helically-shaped wire 15 are cut.

The helically-shaped steel wire 15 may be further cut and/or further processed to form threaded ties, fasteners and rods having an axial core and a plurality of longitudinal helical threads.

Whilst the example manufacturing system in FIG. 5 shows the apparatus and the coil of feed-wire 11 being in one orientation, the apparatus, or any part of it, and/or the coil of feed-wire 11 may be arranged in any orientation suitable for feeding the feed-wire 11.

Helically-Shaped Wire

Figure 6:
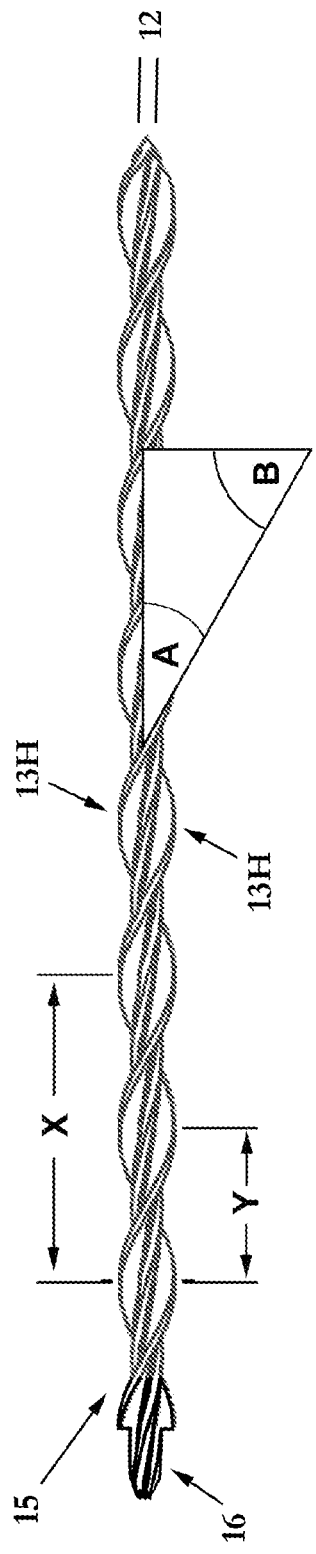
FIG. 6 is a schematic diagram illustrating the difference between the lead and pitch for a fastener, tie or rod having a plurality of helical threads, and illustrates lead and helix angles.

FIG. 6 shows a helically-shaped wire 15 produced by the manufacturing system. In this example the wire has a twisted axial core 12 with a plurality of major helical threads 13H twisted helically around the core 12. The resultant helically-shaped wire 15 can be used to form at least one of: a threaded tie, threaded fastener and threaded rod. The resultant helically-shaped wire 15 has a substantially uniform lead angle B along the length of the wire 15. The lead angle B is typically in the range 50 to 70 degrees, which produces a relatively slack helical formation, say compared to a wood screw. This enables the helically-shaped wire 15, which has a suitably pointed or sharpened tip, to be driven percussively into a substrate, and therefore can function as a fastener in the form of a helical nail. The resultant helically-shaped wire 15 can also be used to secure together parts of brick walls that are separated by cracks. The slack helical formation facilitates a good bond with mortar and the parts of the walls together, which makes it an effective tie. The lead angle B is the angle formed by the helix and the central axis of the helically-shaped wire 15, it is the complement of the helix angle A. The angles are defined by the lead measurement X and the circumference of a notional circumcircle around the outside of the helical threads 13H.

Whilst each major helical thread 13H has a substantially uniform lead angle B (and hence a substantially uniform helix angle A), and therefore has a substantially uniform lead measurement, the axial pitch distance from the peak of one thread and the peak of the next thread may vary along the length of the tie, fastener or rod in some embodiments. In other embodiments, the accuracy of the pitch is approximately equal to the accuracy of the lead.

The lead X of a helical formation is the axial advance of a helix during one complete turn (360°), that is, for a member having first and second helical threads intertwined with one another, the distance from a first peak of the first thread to the next peak on the first thread. The pitch Y is the distance from one peak to next peak, that is for a member having first and second helical threads intertwined with one another, the distance from a first peak of the first thread to the next peak, which is on the second thread Thus when a helical member has a plurality of helical starts, the definition of the pitch measurement differs from the definition of the lead measurement.

In some embodiments of the invention, for helically-shaped wires 15 having a plurality of helical threads 13H, the variation of the lead along the length of each thread can be less than the variation of the pitch. The variation of the lead is calculated by subtracting the minimum lead measurement from the maximum lead measurement along the length of the helical thread 13H measured. The variation of the pitch is calculated by subtracting the minimum pitch measurement from the maximum pitch measurement along the length of the tie, fastener or rod.

For example, take a tie, fastener or rod having first and second helical threads 13H and a circumscribed diameter of say 10 mm, wherein each of the first and second helical threads 13H has a substantially uniform lead angle (and hence substantially uniform helix angle) and has a mean value of the lead measurements of 50 mm. The multiple lead measurements of each given thread 13H may vary from the mean by plus or minus 0.25 mm (0.5% of the mean). In this example of a 2-start helix, the mean peak to peak pitch measurements would be 25 mm, though due to subtle deviations in the cross-sectional depth 17, width, shape or orientation of each major flange 13 in the feed-wire 11, the variation in the distance from a peak of the first thread 13H to an adjacent peak of the second thread 13H may vary from the mean by up to approximately 4% of the mean. So, in this example, the distance from a peak of the first thread 13H to a peak of the second thread 13H (or vice versa) may vary or alternate from 24.0 mm to 26.0 mm.

Accordingly, for a helical member, for example in the form of a twisted tie, twisted fastener or twisted rod that has a plurality of helical threads 13H, the variation in the lead of at least one of the helical threads 13H may be less than half the variation in pitch along the lengths of the threads. Variations in pitch may be useful in some applications. For example, it can provide an improved mechanical interlock, for example when mortar is applied around the helical member. It may also be useful when nailing or tying dissimilar materials, such as to connect a hard brick wall to a wall made of more friable material such as aerated concrete of mortar-filled perforated masonry. A longer pitch distance provides a greater amount of material between the interlocking peaks of the helix to enhance the shear strength at the connection with the more friable masonry material.

The example shown in FIG. 6 is a helical member 15 having work-hardened major threads 13H capable of cutting into a masonry-like substrate such as brick, stone or concrete when percussively driven. The hardness of at least one major thread is in the range 25 to 45 HRc. The helical member 15 has a drivable tip formed at one end. A portion of the major threads 13H has been removed at the other end of the member leaving a shank portion 16 having substantially parallel sides along at least a portion of the shank portion 16. The shank portion 16 has a maximum diameter that is more than 50% of the maximum diameter of the helical member 15. The length of the shank portion 16 is less than or equal to the length of a pitch distance Y. In this example the shank portion 16 has a tapered end.

Making the Plastic Twisting Die

Figure 7:
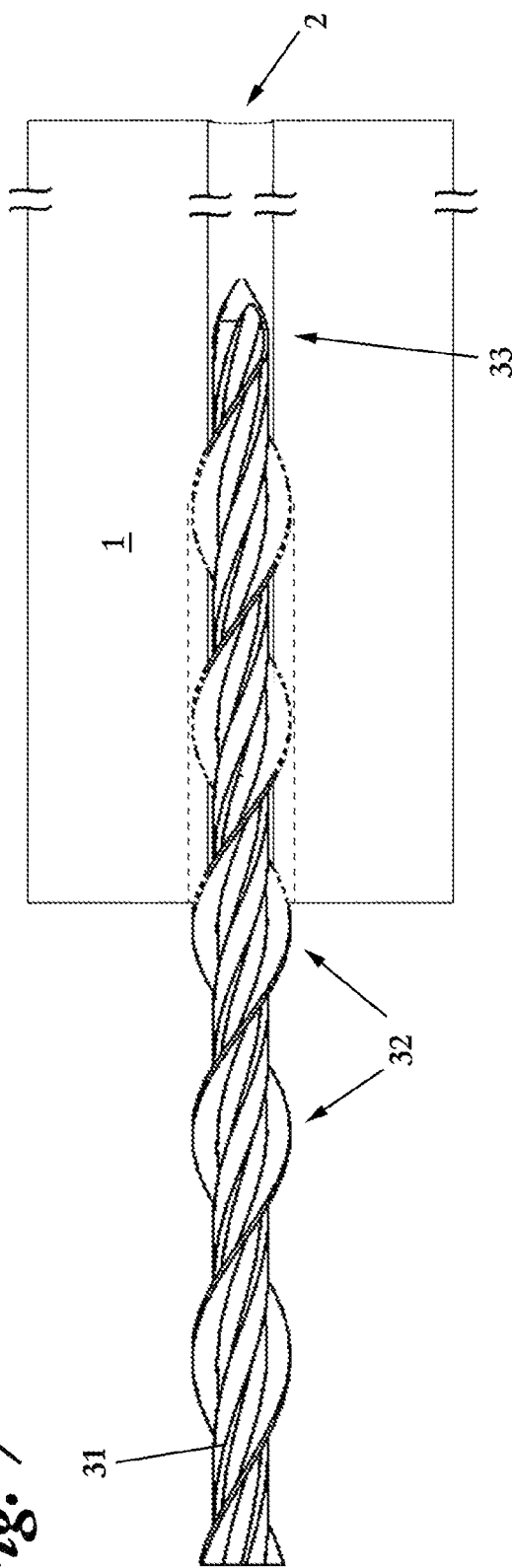
FIG. 7 is a schematic view illustrating the cutting, by means of a tap, of internal helical formations in the plastic die of FIG. 1.

FIG. 7 shows a typical tap 31 being used to cut helical grooves inside a block of plastic, for example in a section of plastic rod, to form the plastic twisting die 1, which is suitable for twisting profiled steel feed-wire 11. The block of plastic has a central longitudinal cavity 2 bored through the material, for example by a drill.

The tap 31 has a plurality of cutting edges in the form of a plurality of longitudinal helical threads 32. Each helical thread 32 has a substantially uniform lead angle, and therefore substantially uniform helix angle. The lead angle is typically in the range 50 to 70 degrees.

The tap 31 is aligned to the cavity 2 and is forced in an axial direction into the plastic rod, for example by way of a percussive or pressing action. The plastic rod is restrained against rotation. The helical threads 32, which are tapered and are harder than the plastic, cut into the plastic. The lead angle of each thread 32 causes the tap 31 to rotate as it advances through the cavity without any separate rotational force being applied.

As the tap 31 advances through the plastic rod, the helical threads 32 form a plurality of internal helical grooves 3 within the wall of the cavity 2 along substantially the whole length of the cavity 2. Each groove 3 cut into the plastic material has a substantially uniform helix angle.

The circumscribed diameter of the helical threads 32 is greater than the inscribed diameter of the die's cavity 2. For the purpose of aligning or centring the tap to the cavity 2, the tap 31 is shaped at one end 33. For example, one end 33 of the tap may be tapered and/or profiled to form a reduced diameter protrusion. The hollow plastic rod may have a countersink formed at one end of the cavity 2.

The helical threads 32 on the tap may be formed by a machining process. Alternatively, the tap 31 may be formed using a portion of helically-shaped wire 15 that has been made using the process shown in FIG. 4 and FIG. 5. For example, a helically-shaped wire 15 which has been extruded from the plastic twisting die 1 can itself be adapted so that it can be used as a multi-start tap 31 for forming helical grooves 3 in plastic material to form a new die 1.

Producing a tap 31 from helical-shaped wire 15 having work-hardened helical threads 13H is much quicker, cheaper and more efficient than forming a tap 31 using a machining process.

Although the present invention has been described in connection with specific preferred embodiments and examples, it should be understood that the invention as claimed should not be unduly limited to such specific embodiments. Furthermore, it will be apparent to the skilled person that modifications can be made to the above embodiment that fall within the scope of the invention. For example, while the die is described as being a single piece of plastic, the die may instead be formed by several pieces of plastic fused end to end such that it is functionally a single article made of plastic prior to the formation internal helical grooves.

The feed-wire 11 can have a different cross-section from the feed-wires shown in FIGS. 3A-3D. The die 1 is arranged according to the cross-section of the feed-wire.

The feed-wire can be made from metals other than steel.

When manufacturing the die, instead of forcing the tap into a rotationally restrained rod, the rod can be forced on to a rotationally restrained tap to produce the die body.

The foregoing invention has been described in accordance with the relevant legal standards, thus the description is exemplary rather than limiting in nature. Variations and modifications to the disclosed embodiment may become apparent to those skilled in the art and fall within the scope of the invention.

The invention claimed is:

1. A twisted helically-shaped member in the form of a twisted tie, twisted fastener, twisted wire or twisted rod; said twisted helically-shaped member having an axial core and a plurality of helical threads extending along the axial core; wherein a variation in lead measurements along the length of at least one helical thread, is less than a variation in pitch measurements along the lengths of the helical threads; the axial core has a transverse cross-sectional area comprising two-fifths or less of the transverse circumscribed cross-sectional area of the helical threads; and the twisted helically-shaped member has an ultimate tensile strength in the range 850 MPa to 1380 MPa.

2. The twisted helically-shaped member according to claim 1, wherein the plurality of helical threads includes a plurality of major helical threads and a plurality of minor helical threads, wherein each major thread has a greater depth than each minor thread, and the variation in lead measurements along the length of at least one major helical thread, is less than a variation in pitch measurements along the lengths of the major helical threads.

3. The twisted helically-shaped member according to claim 2, wherein the variation in the lead measurements of at least one of the major helical threads is less than half the variation in pitch measurements.

4. The twisted helically-shaped member according to claim 1, wherein the lead measurements for each given major thread varies from the mean by up to 0.5% of the mean; and the plurality of major helical threads includes a first major helical thread and a second major helical thread, and the variation in the distance from a peak of the first major helical thread to an adjacent peak of the second major helical thread varies from the mean by up to approximately 4% of the mean.

5. The twisted helically-shaped member according to claim 1, wherein the hardness of at least one thread is in the range 25 to 45 on the Rockwell C scale.

6. The twisted helically-shaped member according to claim 1, including a shank portion at one end.

7. The twisted helically-shaped member according to claim 2, including a shank portion at one end, and having no major helical threads along at least part of the length of the shank portion.

8. The twisted helically-shaped member according to claim 6, wherein the shank portion includes substantially parallel sides along at least part of the length of the shank portion.

9. The twisted helically-shaped member according to claim 6, wherein the shank portion has a maximum diameter that is more than 50% of the maximum diameter of the helical member.

10. The twisted helically-shaped member according to claim 6, wherein the shank portion has a maximum length that is equal to or less than the length of a pitch distance.

11. The twisted helically-shaped member according to claim 6, wherein the shank portion includes a tapered portion at one end.

12. The twisted helically-shaped member according to claim 2, wherein each major helical thread has a lead angle in the range 50 to 70 degrees.

13. The twisted helically-shaped member according to claim 1, including a leading end, wherein the leading end is formed into a drivable tip.

14. The twisted helically-shaped member according to claim 1, wherein the helical threads extend along substantially the whole length of the axial core.

15. The twisted helically-shaped member according to claim 1, wherein each helical thread has a substantially uniform helix angle.

16. The twisted helically-shaped member according to claim 1, including a head, wherein the head is attached to, or formed at one end, of the member.

17. A twisted helically-shaped member in the form of a twisted tie, twisted fastener, twisted wire or twisted rod; said twisted helically-shaped member having: an axial core; a plurality of helical threads extending along the axial core; and a shank portion at one end; wherein a variation in lead measurements along the length of at least one helical thread, is less than a variation in pitch measurements along the lengths of the helical threads; the axial core has a transverse cross-sectional area comprising two-fifths or less of the transverse circumscribed cross-sectional area of the helical threads; and the shank portion has a maximum diameter that is more than 50% of the maximum diameter of the helical member.

18. A twisted helically-shaped member in the form of a twisted tie, twisted fastener, twisted wire or twisted rod; said twisted helically-shaped member having: an axial core; a plurality of helical threads extending along the axial core; and a shank portion at one end; wherein a variation in lead measurements along the length of at least one helical thread, is less than a variation in pitch measurements along the lengths of the helical threads; the axial core has a transverse cross-sectional area comprising two-fifths or less of the transverse circumscribed cross-sectional area of the helical threads; and the shank portion has a maximum length that is equal to or less than the length of a pitch distance.

* * * * *